United States Patent [19]

Onodera et al.

[11] Patent Number: 4,803,354
[45] Date of Patent: Feb. 7, 1989

[54] CIRCUIT FOR CORRECTING OUTPUT PHASE OF ROTARY ENCODER

[75] Inventors: Yoichi Onodera, Hachioji; Hideyuki Horiuchi, Abiko; Chiaki Shimbo, Mitaka, all of Japan

[73] Assignee: Hitachi Medical Corp., Tokyo, Japan

[21] Appl. No.: 36,482

[22] Filed: Apr. 9, 1987

[30] Foreign Application Priority Data

Apr. 9, 1986 [JP] Japan ............................ 61-82643

[51] Int. Cl.[4] ............................................. G01D 5/34
[52] U.S. Cl. .......................... 250/231 SE; 250/237 G; 341/13; 371/30
[58] Field of Search ...................... 250/231 SE, 237 G; 340/347 P, 870.29; 356/395; 324/175

[56] References Cited

U.S. PATENT DOCUMENTS

| | | | |
|---|---|---|---|
| 3,364,359 | 1/1968 | Cronin | 250/231 SE |
| 4,335,306 | 6/1982 | Gort et al. | 250/231 SE |
| 4,346,447 | 8/1982 | Takahama | 250/231 SE |
| 4,427,882 | 1/1984 | Nakaoki et al. | 250/231 SE |
| 4,580,047 | 4/1986 | Sasaki et al. | 250/231 SE |
| 4,593,193 | 6/1986 | Michaelis | 250/231 SE |
| 4,638,155 | 1/1987 | Dorr | 324/175 |

FOREIGN PATENT DOCUMENTS 0146113  8/1985  Japan ........................ 250/231 SE Primary Examiner—David C. Nelms
Assistant Examiner—Michael Messinger
Attorney, Agent, or Firm—Antonelli, Terry & Wands

[57] ABSTRACT

A circuit for correcting a variation in phase of a train of clock pulses detected from a pattern of a coding disc of a rotary encoder which detects the rotation angle of a rotating shaft, comprises an ROM in which data for correction of a phase variation corresponding to the rotation angles of the coding disc are preliminarily stored. The correction data are read from the ROM by designating addresses of the ROM by means of the counter which counts up a train of clock pulses from the rotary encoder before the clock pulse train is subjected to correction. The clock pulses are phase-modulated by the correction data from the ROM to provide a corrected train of clock pulses which correctly represent the rotation angles of the rotating shaft.

8 Claims, 4 Drawing Sheets

CIRCUIT FOR CORRECTING OUTPUT PHASE OF ROTARY ENCODER

BACKGROUND OF THE INVENTION

The present invention relates to a circuit for correcting the output phase of a rotary encoder and, more particularly, to a circuit suitable for correcting a variation in phase of an encoder output pulse due to the eccentricity of a coding disc.

A rotary encoder is used for detecting the rotation angle of a rotating shaft. For example, it constitutes a main part of a synchronizing signal generator in a line printer or the like. A typical structure of the rotary encoder includes a coding disc mounted on a rotating shaft and provided with a multiplicity of marks like slits of a stroboscope, a light detector disposed in the vicinity of the disc, and a counter for counting a train of pulses derived from the light detector, the counter being reset by a signal indicative of the detection of a mark in the disc representing a reference position of the disc.

In the encoder having the above-mentioned structure, a phase error may be included in the output pulse of the encoder. It is said that the phase error is mainly caused by the eccentricity of the coding disc due to a deviation of the center axis of the coding disc from that of the rotating shaft of the encoder. This eccentricity appears as a phase error of a rectangular pulse waveform which is the output of the encoder. This error is an obstacle to accurate detection of the rotation angle of the rotating shaft. Usually, the phase error due to the eccentricity of the coding disc assumes a spurious sinusoidal waveform the period of which corresponds to one rotation of the coding disc.

An example of a rotary encoder capable of correcting such a phase error has been disclosed in JP-A-60-146113 laid open in 1985. In the disclosed rotary encoder, two light detectors are oppositely arranged at an angle of 180° relative to each other around the center axis of a rotating shaft. Variations in phase of the output pulse signals derived from the two light detectors due to the eccentricity of a coding disc appear as sinusoidal variations which have their phases reverse to each other. By summing these two light detector output signals, it is possible to cancel an error in the output of the encoder, thereby allowing accurate detection of the rotation angle. This principle holds for even the case where more than two light detectors are used. In general, as the number of light detectors used increases, more precise correction can be correspondingly made. However, such a rotary encoder using a plurality of light detectors has the problems that it is difficult to make the size of the encoder small since it is difficult to incorporate many light detectors into the encoder the excess space of which is limited and that troublesome and complicated adjustments including a phase matching between the light detectors are required.

SUMMARY OF THE INVENTION

An object of the present invention is to provide a rotary encoder output phase correcting circuit by which the rotary encoder can be constructed with a small size and at a low cost without making the structure of the encoder complicated and the rotation angle of a rotating shaft can be detected with high accuracy.

Another object of the present invention is to provide a rotary encoder output phase correcting circuit the adjustment of which is easy.

A rotary encoder output phase correcting circuit according to the present invention is characterized by comprising means for storing data for correction of an error caused by a variation in position of the rotary encoder, and means for phase-modulating a train of output pulses of the rotary encoder on the basis of the correction data.

DESCRIPTION OF THE PREFERRED EMBODIMENTS

Figure 1:
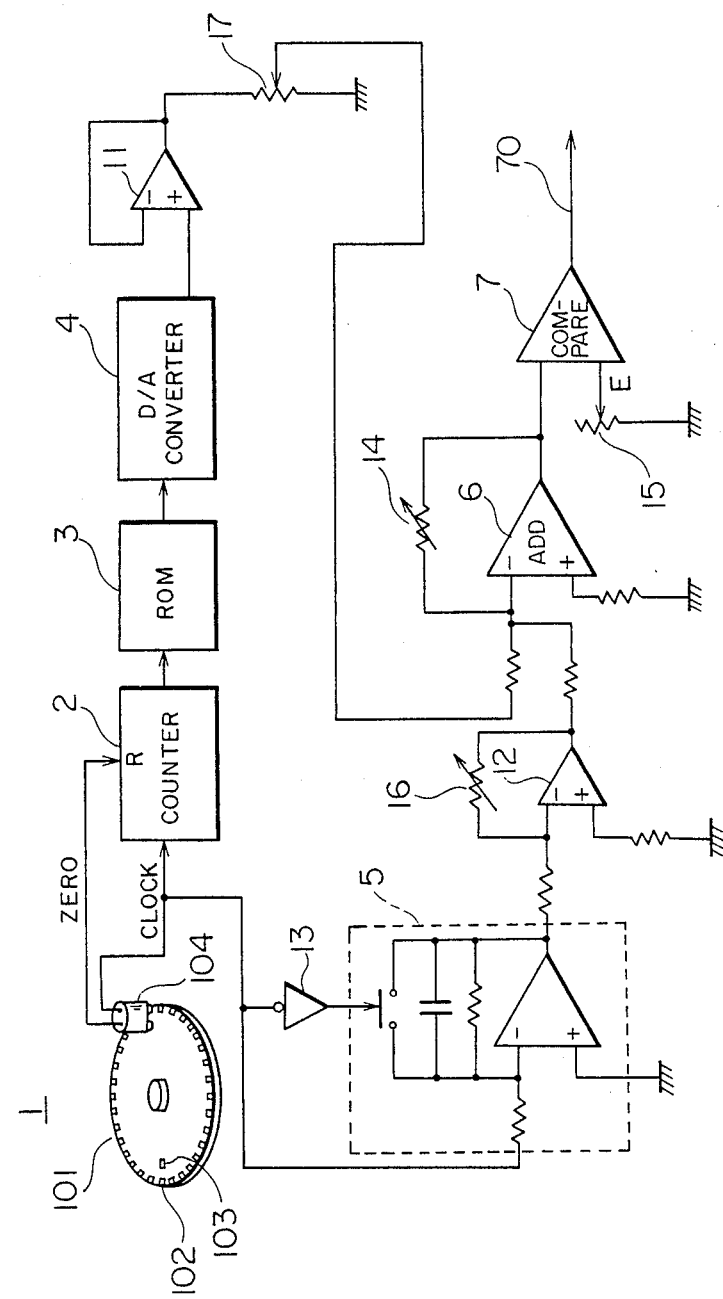
FIG. 1 is a circuit diagram of a rotary encoder output phase correcting circuit according to an embodiment of the present invention.

Referring to FIG. 1 showing a circuit diagram of a rotary encoder output phase correcting circuit according to an embodiment of the present invention, marks 102 are provided like slits of a stroboscope in the outermost periphery of a coding disc 101 mounted on a rotating shaft, namely, at equal distances along the outermost periphery. A mark 103 indicative of a reference angle (0°) is provided at one point on a periphery inside the outermost periphery. A light detector 104 including two photodiodes for detecting the marks 102 and the mark 103 on those peripheries, respectively, is disposed in proximity of the coding disc 101. The inner photodiode produces a zero output for resetting a counter 2 while the outer photodiode produce clock outputs for counting up the counter 2. In place of the coding disc 101 provided with marks may be used a coding disc provided with slits or a coding disc provided with electrical contacts.

A variation in phase of the clock pulses outputted from the encoder having the above-mentioned construction is corrected by a circuit including the counter 2, a read only memory (ROM) 3, a digital-to-analog (D/A). converter 4, an integrator 5, an adder 6, a comparator 7, an amplifier 11, and resistors.

More specifically, output pulses of the encoder 1 are received by the counter 2 which in turn counts the number of pulses to designate an address of the ROM 3 one-to-one corresponding to the counted pulse number. The ROM 3 in which correction data (e.g. sinusoidal data) are written, delivers data at an address designated by the counter 2. The D/A converter 4 converts the digital data read from the ROM 3 into an analog value. On the other hand, the integrator 6 on a line separated from the line including the counter 2, ROM 3 and D/A converter 4 integrates the output pulses of the encoder 1. The adder 6 produces a sum of the output of the D/A converter 4 and the output of the integrator 6 to provide a synthetic waveform thereof. The comparator 7 is preliminarily set to a predetermined reference level and produces a rectangular pulse having a length or duration from a point of time at which the synthetic waveform outputted from the adder 6 reaches the predetermined reference level of the comparator 7 to a point of time at which it becomes to be below the reference level of the comparator 7 again.

Figure 4A:
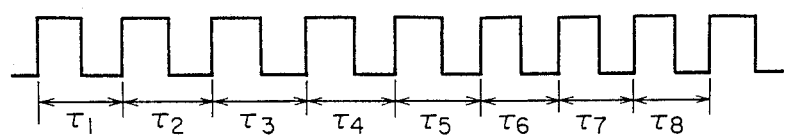
FIGS. 4a to 4e are a timing chart useful for explaining the operation of the circuit according to the embodiment shown in FIG. 1.
Figure 4B:
Figure 4C:
Figure 4D:
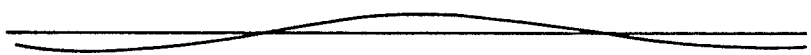

The operation of the circuit according to the embodiment shown in FIG. 1 will now be explained in further detail in conjunction with FIGS. 4a to 4e. FIG. 4a shows a train of clock pulses outputted by the rotary encoder 1. The shown example illustrates a state in which the rotating shaft is rotating at a constant speed. If there exists a deviation of the center axis of the coding disc from that of the rotating shaft, the period of the clock pulse train outputted by the rotary encoder 1 is not constant, as is shown by $\tau_1, \tau_2, -\tau_8-$. In general, an error in phase of the clock pulses relative to the rotation angles of the rotating shaft assumes a sinusoidal waveform, as is shown in FIG. 4d. In the ROM 3 are stored data, as shwon in FIG. 4d, which are defined on the basis of a phase error preliminarily measured for correcting this phase error.

The number of addresses of the ROM 3 shown in FIG. 1 is equal to the number of clock pulses outputted from the encoder 1 during one revolution of the rotating shaft of the encoder 1. First, upon delivery of a zero signal (zero) from the encoder 1 to the counter 2, the counter 2 is reset to zero. Thereafter, the counter 2 counts up the clock pulses and the successive count outputs of the counter 2 sequentially designate the addresses of the ROM 3. In this manner, the correction data stored in the ROM 3 are sequentially read to so that correction is started. The correction data in a digital value read out from the ROM 3 is supplied to the D/A converter 4 at the next stage. Each time a clock pulse is outputted from the encoder 1, the D/A converter 4 converts the corresponding correction data from the ROM 3 into an analog value. The output of the D/A converter 4 is properly adjusted by the non-inverted amplifier 11 provided for stabilizing the output of the D/A converter 4 and a resistor 17 provided for adjusting the output of the D/A converter 4, and is then applied to the adder 6.

Figure 4E:
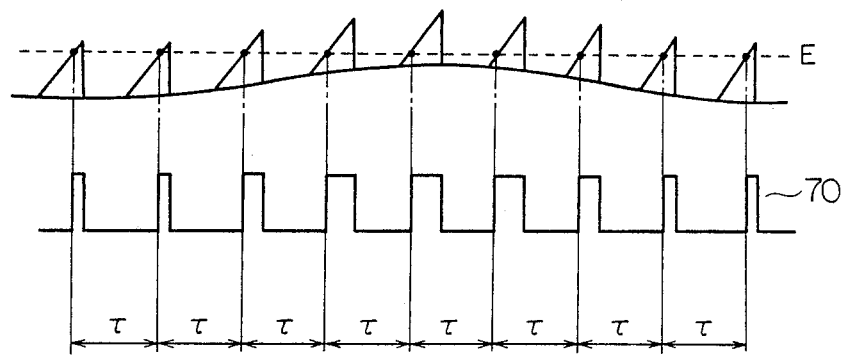

On the other hand, the integrator 5 is designed to integrate the output clock pulses for the encoder 1 while the integrated value is reset by the output of an inverter gate 13 each time the clock pulse becomes low. The integrator 5 delivers its output os sawtooth pulse waveform as shown in FIG. 4c. With the output side of the integrator 5 is connected an inverted amplifier 12 which is turn adjusts the output of the integrator 5 for application to the adder 6. The adder 6 sums the output of the D/A converter 4 and the output of the integrator 5 to produce a synthetic waveform thereof as shown in FIG. 4e. The output of the adder 6 can be adjusted by a variable resistor 14. The comparator 7 compares the output of the adder 6 with a reference voltage level indicated by a dotted line E in FIG. 4e to generate an output of rectangular waveform which is at a high level only during a period in which the sawtooth portion of the synthetic waveform is higher than the reference level E. Thus, a train of pulses 70 as shown in FIG. 4e is obtained from the comparator 7. As is seen, the rise phase of each pulse is modulated depending on the correction data. Namely, the phase is advanced if the correction data value is positive and is delayed if it is negative.

With the above-described operation, the variation in phase of the output pulse train from the rotary encoder 1 is corrected, thereby providing a pulse train, as shown in FIG. 4e, which has a constant period $\tau$. The pulses 70 are counted up by an ordinary counter (not shown) for use as a signal representing the rotation angle of the rotating shaft.

As is explained above, it is possible to detect the rotation angle with high accuracy according to the present embodiment since the error in phase of the output clock pulses from the rotary encoder is corrected for each rotation angle of the coding disc 101 on the basis of the correction data stored in the ROM 3. The correction is possible even if a phase error generated may be of any pattern other than the sinusoidal waveform.

Figure 2:
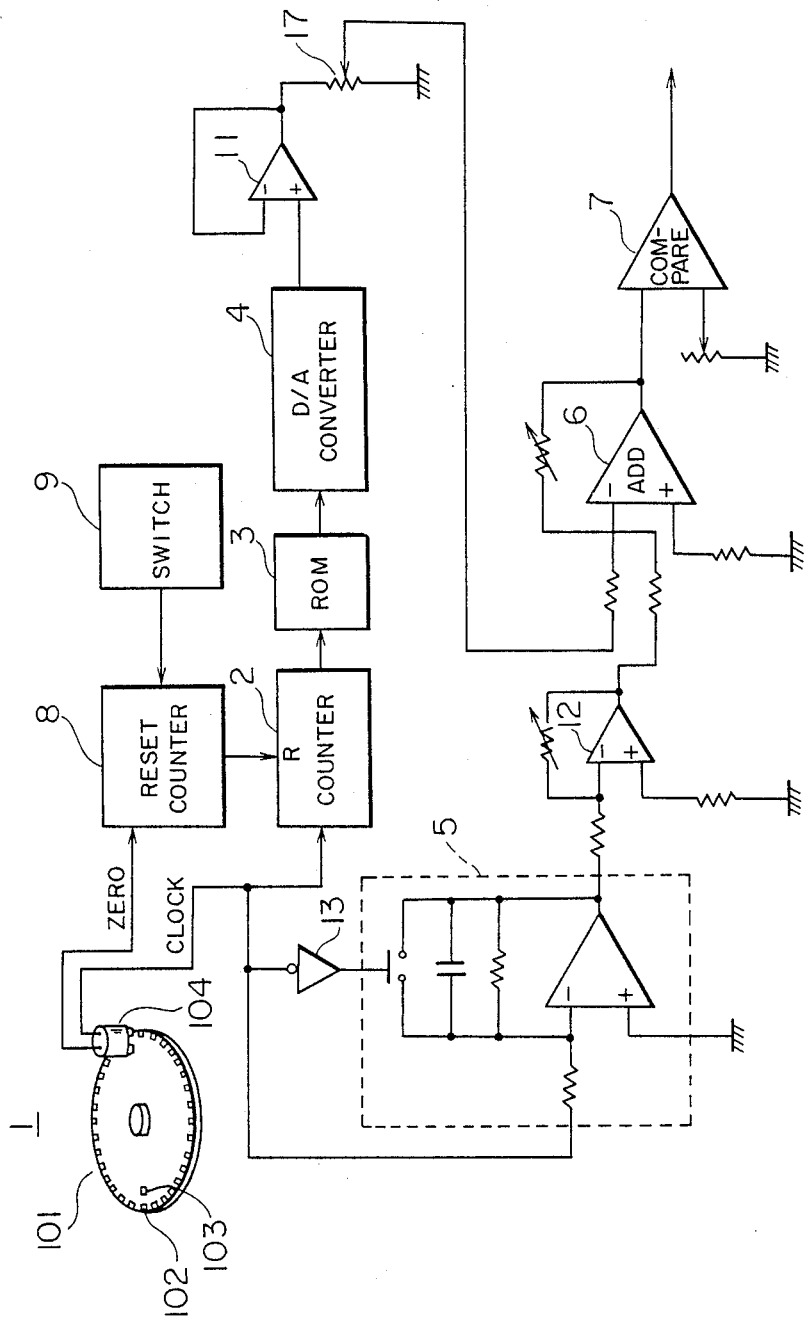
FIGS. 2 and 3 are circuit diagram s showing modifications of the circuit of FIG. 1 as other embodiments of the present invention.

FIG. 2 shows another embodiment of the present invention. In the present embodiment, a counter 8 for resetting the counter 2 and a switch 9 are added to the circuit shown in FIG. 1. First, a phase at which correction for an encoder output variation due to the eccentricity of the coding disc 101 should be started, i.e. the predetermined number of pulses after a zero signal, is established by the switch 9. The reset counter 8 which is a down counter, starts its counting operation by the zero signal (zero) outputted from the encoder 1. When the reset counter 8 counts the predetermined pulse number established by the switch 9, the reset counter 8 delivers a reset signal to the counter 2 so that correction is started. For example, in the case where correction data after the counter of 10 are stored in the ROM 3, ten (10) is set in the reset counter 8 by establishing the switch 9 to ten. If the zero signal is outputted from the encoder 1, the reset counter 8 is activated to count in a down direction as 10, 9, 8,—. The reset counter 8 delivers the reset signal to the counter 2 when the counter 8 counts down to 0 (zero). At this point of time, the addressing of the ROM 3 by the counter 2 is initiated so that the correction is started.

In the case of the preset embodiment, it is not necessary to measure the actual variation in output phase of the encoder 1 for preparation of correction data to be stored in the ROM 3. It is only required to store, in the ROM 3, correction data of a special pattern for correcting a sinusoidal phase variation which is a typical example of the encoder output phase variation. Since the phase of the correction data pattern can be adjusted by a value to be set to the switch 9 while the amplitude thereof can be adjusted by the variable resistor 17, it is possible by both the adjustments to cancel the phase variation which actually generates in the output of the rotary encoder 1.

Further explanation will be omitted because the construction of the embodiment of FIG. 2 is the same as that of the embodiment of FIG. 1 excepting the reset counter 8 and the switch 9.

Figure 3:
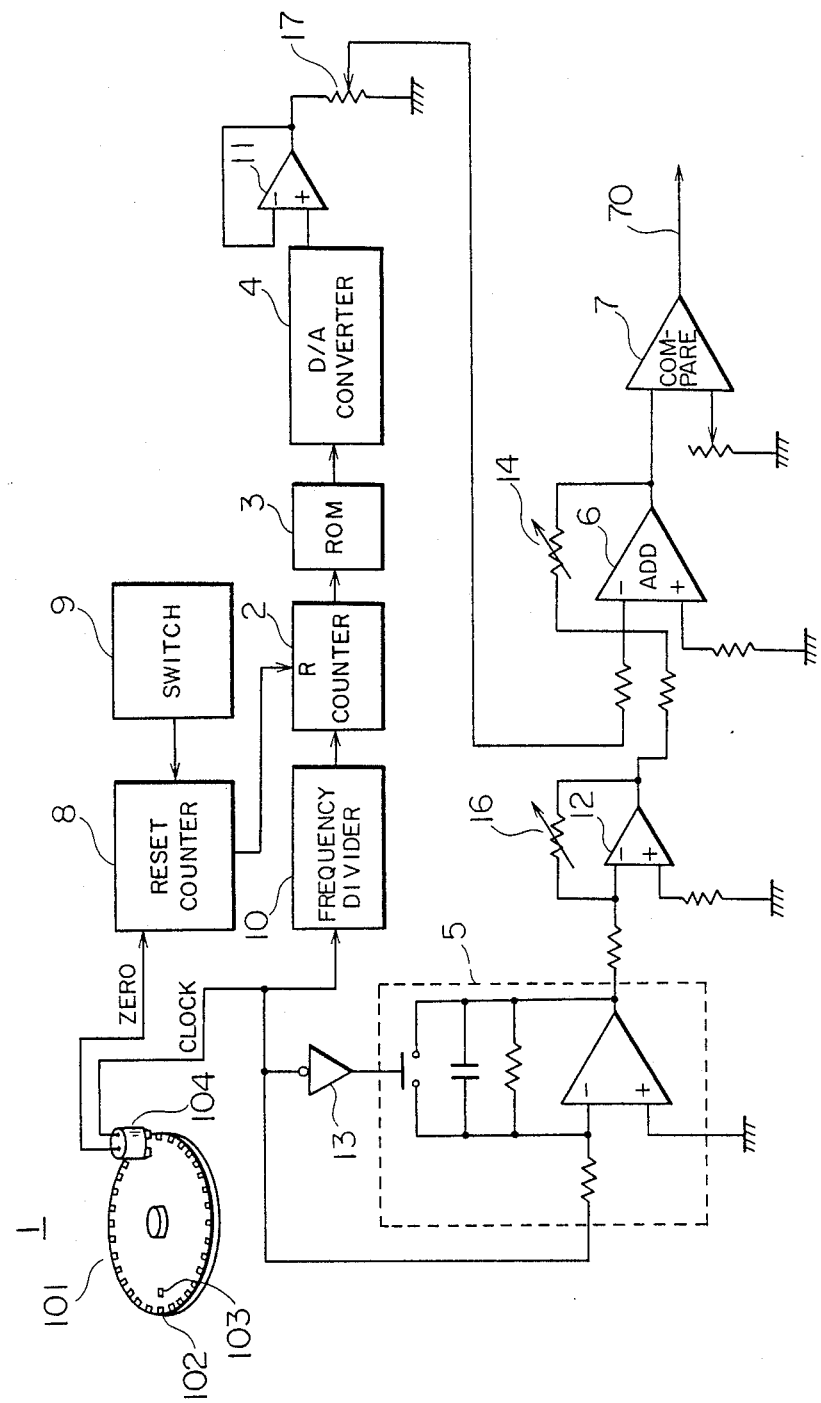

FIG. 3 shows a further embodiment of the present invention. In the present embodiment, a frequency divider 10 is added to the circuit shown in FIG. 2. The embodiment of FIG. 3 is also applicable to the structure of FIG. 1. The frequency divider 10 is provided for dividing the output pulse train of the encoder 1 into a predetermined number. In general, the number of pulses outputted from the encoder during one revolution of the rotating shaft is very large. Therefore, it is not practical to prepare correction data in the ROM 3 corresponding to all the output pulses, since an increased capacity is required for each of the counter 2 and the ROM 3. For example, when 5000 pulses are outputted from the encoder during one revolution of the rotating shaft, the storage of correction data the amount of which is one-fourth to a several-tenth (e.g. one-sixteenth) of those pulses, suffices. Namely, each correction data in the ROM 3 is not prepared for each output pulse from encoder 1, but is prepared, for example, for every sixteen pulses from the encoder 1. The output pulses of frequency divider 10 are supplied to the counter 2 which is provided for designating an address in the ROm 3. Therefore, the correction data read out from the ROM 3 and supplied to the adder 6 is received for every sixteen pulse outputs of the encoder 1. Thus, the phase variation of the encoder output can be cancelled by using the data stored in a small capacity ROM.

Explanation of a part of the circuit of FIG. 3 other than the frequency divider 10 will be omitted since it is the same as the circuit of FIG. 2.

In the foregoing embodiments, it is necessary to take account of the fact that the output pulse train 70 derived from the phase correcting circuit has a phase delay as a constant offset relative to the pulse train generated from the rotary encoder 1. Further, in those embodiments, accurate correction for a variation in phase of the encoder output pulse train can be performed when the rotating shaft of the rotary encoder 1 rotates at a specified speed. Therefore, if a rotating shaft having a rotation speed different from the specified speed is used, it is necessary to adjust a value of the variable resistor 16 or 17 or the integration constant of the integrator 5 for performing correction adapted to the rotation speed of the rotating shaft used.

The above description has been made in conjunction with only the phase correction of the rise position of the encoder output pulse train. In general, the output of the encoder has A and B phases and hence it is sometimes preferable to subject both the rise and fall positions of the pulse train in each phase to phase correction. In such a case, it is necessary to additionally provide a similar circuit to the phase correcting circuit shown in each of FIGS. 1 to 3 for the phase correction of the fall position of the pulse train. Further, by providing individual phase correcting circuits for the A and B phases, the detection of rotation position with high accuracy for a general use is possible.

Though the foregoing description has been made in conjunction with the case where sinusoidal data are stored a data for phase correction, the present invention is not limited to such a case. Namely, if it is possible to preliminarily measure data of phase variation and hence to known phase correction data, such correction data are to be stored in the ROM.

We claim:

1. A circuit for correcting the output phase of a rotary encoder which delivers a train of output pulses representing the rotation angles of a rotating disc detected by a light detector, said circuit comprising:
   correction data storing means for storing therein data for correction of an error caused by a variation in position of said rotary encoder; and
   phase modulating means for phase-modulating the output pulses of said rotary encoder on the basis of the correction data outputted from said correction data storing means, wherein said phase modulating means produces the sum of an integrated value of the output pulses of said rotary encoder and a digital-to-analog converted value of the correction data of said correction data storing means and compares a value of the produced sum with a predetermined reference value to produce a rectangular waveform having a duration from a point of time at which the sum value reaches said predetermined reference value to a point of time at which the sum value becomes to be below said predetermined reference value.

2. A circuit according to claim 1, wherein said correction data storing means includes an address counter in which a heading address of the correction data is set, said address counter being activated after it counts down from zero to said heading address by a zero output from said rotary encoder.

3. A circuit according to claim 1, wherein the storing of the correction data into said correction data storing means and the reading of the correction data therefrom are performed by using a divided value of the number of output pulses from said rotary encoder as an address.

4. A circuit for correcting the output phase of a rotary encoder which delivers a train of output pulses representing the rotation angles of a rotating disc detected by a light detector, said circuit comprising:
   correction data storing means for storing therein data for correction of an error caused by a a variation in position of said rotary encoder; and
   phase modulating means for phase-modulating the output pulses of said rotary encoder on the basis of the correction data outputted from said correction data storing means wherein said phase modulating means produces the sum of an integrated value of the output pulses of said rotary encoder and a digital-to-analog converted value of the correction data of said correction data storing means and compares a value of the produced sum with a predetermined reference value to produce a rectangular waveform rising at a point of time at which the sum value reaches said predetermined reference value.

5. A circuit for correcting a phase error in a signal of a train of pulses generated from a rotary disc representing rotation angles thereof, comprising:
   means for storing data for compensating for positional variations of said data;
   means for deriving said compensating data from said storing means in response to said signal of said train of pulses;
   means for integrating said signal of said train of pulses;
   means for superposing an output of said integrating means on an output of said deriving means for generating a modulated signal of said train of pulses; and
   means for comparing said modulated signal of said train of pulses with a reference value and for producing a corrected signal of a train of pulses indicative of a point of time when a respective pulses in said modulated signal of said train of pulses first reaches said reference value.

6. A circuit according to claim 5, wherein said deriving means including a heading address setting circuit for said storing means and a counter circuit for addressing said storing means in response to said heading address setting circuit.

7. A circuit according to claim 5, wherein said storing means includes a frequency divider for dividing a frequency of said signal of said train of pulses from said rotary disc, and a memory coupled to said frequency divider so that said compensating data is stored in said storing means at addresses associated with the output of said frequency divider.

8. A circuit according to claim 5, wherein said storing means provides an analog output of said compensating data.

* * * * *